United States Patent
Chang et al.

(10) Patent No.: US 7,722,794 B2
(45) Date of Patent: May 25, 2010

(54) METHOD FOR PRODUCING A SEALABLE BIAXIALLY ORIENTED POLYPROPYLENE FILM FOR PACKAGING

(75) Inventors: Keunsuk P. Chang, North Kingstown, RI (US); Enrico Ballico, Marino (IT); Carmelo DiCostanzo, Lanciano (IT)

(73) Assignees: Toray Plastics (America), Inc., N. Kingstown, RI (US); Bimo Italia, S.p.A., Atessa (Chieti) (IT)

( * ) Notice: Subject to any disclaimer, the term of this patent is extended or adjusted under 35 U.S.C. 154(b) by 668 days.

(21) Appl. No.: 11/052,245

(22) Filed: Feb. 8, 2005

(65) Prior Publication Data

US 2006/0177650 A1 Aug. 10, 2006

(51) Int. Cl.
B29C 47/04 (2006.01)
B29C 59/16 (2006.01)
(52) U.S. Cl. ............... 264/448; 264/173.12; 264/173.16
(58) Field of Classification Search .................. 264/448
See application file for complete search history.

(56) References Cited

U.S. PATENT DOCUMENTS

| | | | |
|---|---|---|---|
| 4,384,024 A | * | 5/1983 | Mitchell et al. ............. 428/349 |
| 4,643,945 A | | 2/1987 | Kiang |
| 5,530,065 A | | 6/1996 | Farley et al. |
| 5,874,139 A | | 2/1999 | Bosiers et al. |
| 5,888,648 A | | 3/1999 | Donovan et al. |
| 5,942,579 A | | 8/1999 | Falla et al. |
| 6,190,760 B1 | | 2/2001 | Nagai et al. |
| 6,231,975 B1 | | 5/2001 | Kong et al. |
| 6,423,420 B1 | | 7/2002 | Brant |
| 6,458,469 B1 | | 10/2002 | DeLisio et al. |
| 6,790,524 B2 | * | 9/2004 | Chang et al. ................. 428/336 |
| 6,838,520 B2 | * | 1/2005 | Etherton ...................... 525/191 |

OTHER PUBLICATIONS

U.S. Appl. No. 10/744,081, filed Dec. 24, 2004.

* cited by examiner

*Primary Examiner*—Monica A Huson
(74) *Attorney, Agent, or Firm*—Morrison & Foerster LLP (57) ABSTRACT

A method for manufacturing a surface-treated laminated film is provided. The produced film should include at least a surface treated polyolefin-containing resin layer with a flame or corona treated surface and a heat sealable resin layer having a storage shear modulus of 400,000 Pa or less at 100 rad/s at 121° C., 100,000 Pa or less at 10 rad/s at 121° C., and 5000 Pa or less at 1 rad/s at 121° C. The method may involve coextruding a laminated film that includes at least a polyolefin-containing resin layer and a heat sealable resin layer. The laminated film may be simultaneously stretched in machine and traverse direction, and subsequently surface treated to produce a surface-treated laminated film.

13 Claims, 5 Drawing Sheets

Oxygen Barrier Durability vs. Elongation Force

Compatibility with Polyethylene Zipper Stock

Figure 4.

Comparison of Heat Seal Properties and Seal Initiation Temperature

Figure 5.

METHOD FOR PRODUCING A SEALABLE BIAXIALLY ORIENTED POLYPROPYLENE FILM FOR PACKAGING

FIELD OF INVENTION

The invention is generally in the field of packaging film. More particularly, it relates to a sealable biaxially oriented polypropylene film that is preferably metallized on one or both sides of the sealable biaxially oriented polypropylene film. The polypropylene film of this invention exhibits both excellent tensile properties and heat seal properties, while maintaining superior barrier properties against gas, including oxygen, and moisture transmission across the film even under when the film is exposed to high tensile stresses as those caused by a packaging machinery. The film of this invention also has superior bag forming and heat seal properties.

BACKGROUND OF THE INVENTION

There are a variety of applications, such as food packaging, that require packaging film that have excellent tensile, heat seal and gas barrier properties. However, there are several problems with current packaging films.

U.S. Pat. No. 4,643,945 (Kiang) discloses a polymer blend useful for forming heat sealable plastic film, which comprises 60% to 40% by weight of propylene-ethylene-butene terpolymers wherein the ethylene content is about 0.1-10.0 mole percent and the 1-butene content is about 0.1-10.0 mole percent, and about 40%-60% by weight of a second component of copolymers of ethylene and alpha olefins containing four or more carbon atoms. The examples indicate seal initiation temperatures in the range of 105° C. to 120° C. These seal initiation temperatures are generally considered to be high.

U.S. Pat. No. 5,530,065 (Farley) discloses a film comprising at least one layer containing from of about 40 to of about 99 weight percent of a metallocene polyethylene copolymer and about 1 to 60 weight percent on a Ziegler-Natta based ethylene interpolymer such as linear low density polypropylene (LLDPE). These blends have low seal initiation temperatures. However, it is difficult to process these polymers in the conventional sequential machine direction orientation (MDO) and transverse direction orientation (TDO) biaxially oriented polypropylene (BOPP) process due to the very low melting temperatures associated with these polymers.

U.S. Pat. No. 5,874,139 (Bosiers) discloses a multi-layer structure having a sealant layer and a polypropylene layer, the sealant layer comprising a polymer mixture of from about 30 to 55 weight percent of a homogeneously branched substantially linear ethylene copolymer having a density in the range of 0.885 and 0.905 g/cc and 45 to 70 weight percent of a heterogeneously branched linear ethylene copolymer with a density in the range of 0.91 to 0.95 g/cc. The heat seal initiation temperature of these resin blends is in the range of existing BOPP films. However, Bosiers' polymers suffer from the same defects as Farley's polymers.

U.S. Pat. No. 5,888,648 (Donovan) discloses a multilayer film for forming hermetic seals comprising a main film substrate and a two-layer sealant layer which itself comprises of an intermediate layer selected for sufficient flow property under sealing conditions and an outer sealant layer bonded to the intermediate layer to provide a seal under sealing conditions. Resins cited in the examples for the intermediate layer are LLDPE, ethylene-propylene random copolymer, ethylene-propylene-butene terpolymer, a metallocene catalyzed polyethylene, and blends of these. The sealant layer resins cited in the examples are ethylene-propylene-butene terpolymers or ethylene-propylene random copolymer. Such film structures are expensive and bulky due to the thick intermediate layer required to achieve a hermetic seal.

U.S. Pat. No. 6,190,760 (Nagai) discloses an oriented metallized polypropylene film comprising a metal adhesion layer of a polypropylene resin of mesopentad fraction 60-88%. A coextruded heat sealable layer opposite the metal adhesion layer comprises an ethylene-propylene-butene terpolymer. This film does not have good low seal initiation properties.

U.S. Pat. No. 6,231,975 (Kong) discloses an oriented sealable film comprising an inner layer comprising greater than 80% by weight of isotactic polypropylene or syndiotactic polypropylene, a sealing layer which can be an ethylene-propylene random copolymer, ethylene-butene copolymer, ethylene-propylene-butene terpolymer, butene-propylene copolymer, Ziegler Natta catalyzed polyethylene or a metallocene catalyzed polyethylene, and a separable layer positioned between the inner layer and sealing layer. The separable layer comprises a blend of linear low density polyethylene and ethylene-propylene block copolymer. Kong's film would not have the proper seal initiation properties without the separable layer.

U.S. Pat. No. 6,423,420 (Brant) discloses an oriented multilayer film, comprising an outer layer comprising a metallocene catalyzed polyethylene having a density of 0.900 to 0.935 g/cm3 and a composition distribution breadth index of 50 to 95%; and a polypropylene core layer. This film does not have good low seal initiation temperature properties.

U.S. Pat. No. 6,458,469 (DeLisio) discloses an oriented multilayer film comprising a base layer, at least one tie layer, and at least one outer layer consisting of a metallocene catalyzed polyethylene. This metallocene catalyzed polyethylene layer does not have good low seal initiation temperature or hot tack properties.

U.S. patent application Ser. No. 10/744,081 (Su) discloses blends of propylene-ethylene-butene terpolymer and metallocene-catalyzed polyethylene or metallocene-catalyzed ethylene copolymers. This film does not have good low seal initiation properties.

In light of the deficiencies of the prior art, this invention provides several advantages, among others, to provide an economical solution to the product packager and provide the heat seal properties of a low seal initiation temperature, hot tack performance, high hermetic seal attributes and seal through contamination as well as superior flat sheet and formed bag barrier durability.

SUMMARY OF THE INVENTION

An embodiment of the film of this invention solves the problems of conventional biaxially oriented polypropylene (BOPP) metallized films by providing a novel BOPP metallized film with exceptionally high tensile properties which provides greater resistance to stresses exerted on the film by typical packaging machines. Another embodiment of the film of this invention has a metallized layer for high barrier packaging film with excellent formed bag barrier properties. The films of this invention could also offer excellent hermetic seal properties, as characterized by very low seal initiation temperatures and low shear rheology.

An embodiment of this invention is a laminate film comprising (a) a surface treated polyolefin-containing resin layer having a flame or corona treated surface and (b) a heat sealable resin layer that is not directly on the flame or corona treated surface, the heat sealable resin layer having a storage shear modulus of 400,000 Pa or less at 100 rad/s at 121° C., 100,000 Pa or less at 10 rad/s at 121° C., and 5000 Pa or less at 1 rad/s at 121° C.; wherein tensile properties in a machine direction of the laminate film include: Young's modulus of 350,000 psi (2,413,165 kPa) or more, an elongation of 120% or less, and a tensile strength of 27,000 psi (186,158 kPa) or more. Preferably, the heat sealable resin layer is directly on a surface of the surface treated polyolefin-containing resin layer opposite the flame or corona treated surface. The laminate film could further comprise an additional polyolefin-containing resin layer between the surface-treated polyolefin-containing resin layer and the heat sealable resin layer, wherein an order of layers in the laminate film is the heat sealable resin layer, the additional polyolefin-containing resin layer, and the surface treated polyolefin-containing resin layer. The laminate film could further comprise a metal layer directly on the surface treated polyolefin-containing resin layer, wherein an order of layers in the laminate film is the heat sealable resin layer, the additional polyolefin-containing resin layer, the surface treated polyolefin-containing resin layer and the metal layer. Preferably, the laminate film has an oxygen transmission rate of 60 cc/m$^2$/day or less through the laminate film when the laminate film is elongated at 11,000 grams per 4.75 inches (121 mm) of film width elongation force. Preferably, the heat-sealable layer has a thickness of about 0.5 to 5.0 µm. Preferably, the heat sealable layer comprises an anti-blocking agent of about 0.05 to 0.5 percent by weight of said heat sealable layer. Preferably, the surface treated polyolefin-containing resin layer comprises additives that enhance metal adhesion or metal formation, and the metal layer has a thickness of about 5 to 100 nm and an optical density of about 1.8 to 5.0. Preferably, the laminate film is biaxially oriented at 5.5-8.0 stretch ratio in the machine direction and 7.0-12.0 stretch ratio in a direction transverse to the machine direction. Preferably, the surface treated polyolefin-containing resin layer comprises an antiblock component selected from the group consisting of amorphous silicas, aluminosilicates, sodium calcium aluminum silicate, a crosslinked silicone polymer and polymethylmethacrylate. Preferably, the surface treated polyolefin-containing resin layer comprises a propylene homopolymer resin of isotactic content of 60-88% mesopentad fraction, an isotacticity of less than 90%, and a heat of crystal fusion of 20-90 J/g. Preferably, the surface treated polyolefin-containing resin layer comprises a blend of propylene homopolymer and a propylene-containing copolymer with ethylene in amounts of 0.5 to 10% ethylene, and the blend comprises 50 to 5% of said propylene-containing copolymer with ethylene and 5 to 50% of said propylene homopolymer.

Another embodiment is a laminate film comprising (a) a surface treated polyolefin-containing resin layer having a flame or corona treated surface and (b) a heat sealable resin layer that is not directly on the flame or corona treated surface, the heat sealable resin layer comprising a plastomer; wherein tensile properties in a machine direction of the laminate film include: Young's modulus of 350,000 psi (2,413.165 kPa) or more, an elongation of 120% or less, and a tensile strength of 27,000 psi (186,158 kPa) or more, and the heat sealable resin layer is not directly on the flame or corona treated surface.

Yet another embodiment is a method of manufacturing a laminate film comprising extruding the laminate film by simultaneously stretching the laminate film in machine and transverse directions of the laminate film and surface treating the laminate film; whereby the laminate film comprises (a) a surface treated polyolefin-containing resin layer having a flame or corona treated surface and (b) a heat sealable resin layer that is not directly on the flame or corona treated surface, the heat sealable resin layer having a storage shear modulus of 400,000 Pa or less at 100 rad/s at 121° C., 100,000 Pa or less at 10 rad/s at 121° C., and 5000 Pa or less at 1 rad/s at 121° C.; wherein tensile properties in a machine direction of the laminate film include: Young's modulus of 350,000 psi (2,413,165 kPa) or more, an elongation of 120% or less, and a tensile strength of 27,000 psi (186,158 kPa) or more.

Additional advantages of this invention would become readily apparent to those skilled in this art from the following detailed description, wherein only the preferred embodiments of this invention is shown and described, simply by way of illustration of the best mode contemplated for carrying out this invention. As would be realized, this invention is capable of other and different embodiments, and its details are capable of modifications in various obvious respects, all without departing from this invention. Accordingly, the drawings and description are to be regarded as illustrative in nature and not as restrictive.

DETAILED DESCRIPTION OF THE INVENTION

The detailed description illustrates by way of example, not by way of limitation, the principles of the invention. This description would clearly enable one skilled in the art to make and use the invention, and describes several embodiments, adaptations, variations, alternatives and uses of the invention, including what is presently believed to be the best mode of carrying out the invention.

The films of this invention could comprise a multi-layer polyolefin-containing (preferably, propylene-containing) film, e.g., a two or three layers of coextruded film and optionally a vapor-deposited metal layer, with the multi-layer propylene polymer-containing film exhibiting machine direction tensile properties that are in the range of 400,000 psi (2,757,903 kPa) or higher Young's modulus, 110% or lower elongation (% strain at ultimate), and 30,000 psi (206,843 kPa) or higher tensile strength (stress at ultimate).

In one embodiment, the core or base layer of the coextruded multilayer layer film could be a propylene homopolymer resin. A sealant layer could be coextruded on one side of the core layer. The sealant layer could include a plastomer. A plastomer is a very low crystallinity and low density polymer, typically based on low density polyethylene. Typical crystallinity is 10% or less (whereas isotactic polypropylene is usually 40-50% as a comparison) and typical density is 0.90 or less. Preferably, the plastomer could be a polyolefin-containing plastomer such as an ethylene-octene plastomer, ethylene-containing octene plastomer, ethylene-containing hexene plastomer, ethylene-containing butene plastomer, or combinations thereof. These types of plastomer sealants exhibit very low sealant initiation temperature properties, high seal strengths, and provide hermetic, caulkable seals. The sealant layer formulation preferably could include anti-blocking additives in order for the film to machine and wind more easily and to help prevent pick-off of the metal layer after vacuum deposition metallizing.

In one variation, on the second side of the core layer (which is not the side of the core layer having the sealant layer) could be a second resin layer of a coextruded polyolefin resin. Either the core layer or the second resin layer could be discharge treated by plasma or corona treatment for improved metal adhesion of a metal layer on the treated surface. The discharge-treatment generally provides an increase in the surface energy of the treated surface to make it suitable for metallization.

Preferably, the second resin layer is coextruded onto the side of the core layer opposite the sealant layer and formulated to promote metal adhesion. The metallizing surface of the second resin layer could be modified with a corona discharge or flame treatment method to enhance adhesion and wettability of the vapor-deposited metal. The second resin layer is also referred to as a "metal adhesion layer." In one variation, the metal adhesion layer is a polyolefin metal adhesion layer comprising a low isotactic content propylene homopolymer of 60-88% mesopentad fraction. The layer provides a metal adhesion after vacuum deposition of aluminum, of ca. 200 g/in (200 g/25 mm) or more adhesion. A high metal adhesion strength aids in helping to prevent the vapor-deposited metal from being picked-off by the sealant layer when the film is wound in roll form and there is intimate contact between the aluminum and the sealant layer. The metallization of the treated surface could be accomplished via vacuum deposition of a suitable metal such as aluminum to an optical density of 1.5-5.0.

The biaxially oriented polyolefin-containing laminate films (preferably metallized) of this invention could perform multiple functions, including providing light, moisture, and oxygen barrier for gas-flush applications. It can provide a heat sealable inner layer for bag forming and sealing; and it can maintain sufficient oxygen and moisture barrier properties after bag-forming and filling in order to retain the benefits of gas-flushing salty and oily snacks such as potato chips. It also could have heat sealable properties that maintain the integrity of the sealed bag, reducing bag "leakers" and loss of shelf-life properties as a result. It could also be used with a highly caulkable, hermetic sealant that seals around contaminants in a bag's seal areas of the bag made of the film of this invention. Preferably, the film of this invention has a peelable seal.

U.S. Pat. No. 6,790,254 (Chang) discloses a high barrier and barrier durable film with a high tensile strength BOPP film. Chang cites the use of ethylene-propylene-butene terpolymers as a sealant layer. Chang is incorporated herein by reference.

In one embodiment of the invention, the biaxially oriented multi-layer film comprises: a polyolefin core resin layer, preferably a resin containing polypropylene; a heat sealable skin layer coextruded onto one side of said core layer of an ethylene-containing plastomer; a polyolefin metal adhesion layer coextruded onto the side of the core layer opposite the heat sealable skin layer; and a metal layer vapor deposited upon the metal adhesion layer's side opposite said core layer. The polyolefin metal adhesion resin layer side opposite the core layer is corona discharge or flame treated, and the metal layer is deposited on the treated side of the metal adhesion skin resin layer.

The core layer can be any polyolefin polymer that can be uniaxially or biaxially oriented. Such polymers include but are not limited to isotactic propylene homopolymer, syndiotactic propylene homopolymer, metallocene-catalyzed isotactic propylene homopolymer, metallocene-catalyzed syndiotactic propylene, ethylene-propylene random copolymer, butene-propylene random copolymer, ethylene-propylene-butene copolymer, high density polyethylene, low density polyethylene, linear low density polyethylene, and blends thereof. Most preferred is a core layer of an isotactic propylene homopolymer resin of greater than 88% mesopentad fraction, preferably 90% mesopentad fraction or more as measured by $^{13}$C-NMR; an isotacticity of 90% or more, preferably 92% isotacticity or more as measured by the weight of the non-dissolved amount when the polypropylene is extracted with boiled n-heptane; and a heat of crystal fusion of 100 J/g or more as measured by differential scanning calorimetry. The isotactic polypropylene resin can be defined as having a melt flow in the range of 1-9 g/10 min. More particularly preferred is a melt flow rate in the range of 1-5 g/10 min. Most particularly preferred is a melt flow rate in the range of 1-3 g/10 min. The polyolefin core resin layer could have a thickness of about 6 to 40 μm thick after biaxial orientation, preferably 12-25 μm.

The metal layer is preferably a vapor deposited metal, more preferably vapor deposited aluminum. The metal layer shall have a thickness between 5 and 100 nm, preferably between 20 and 80 nm, more preferably between 30 and 70 nm; and an optical density between 1.5 and 5.0, preferably between 2.0 and 4.0, more preferably between 2.2 and 3.2.

Figure 1:
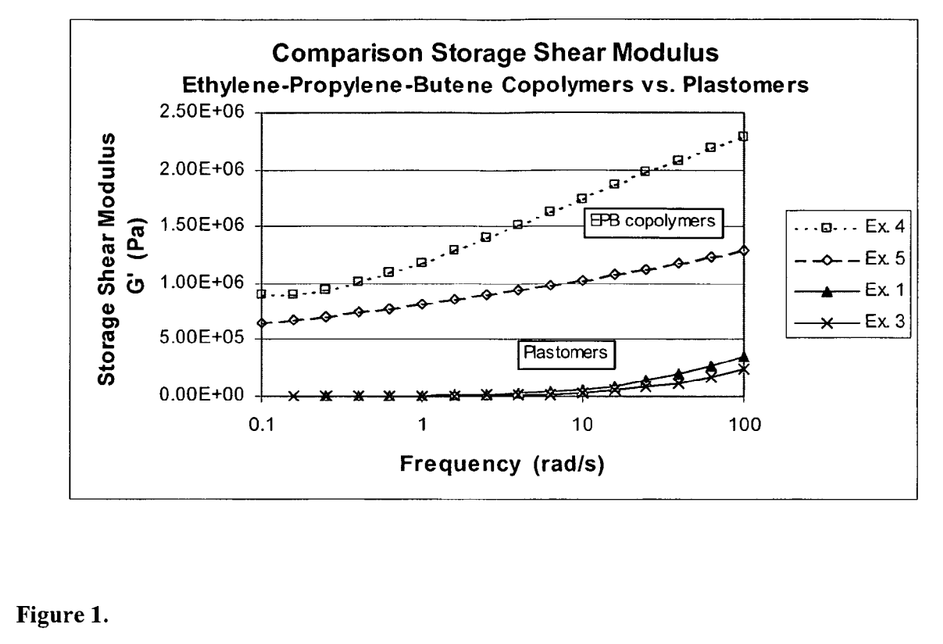
FIG. 1 shows storage shear modulus of the plastomer resins used as sealants in the laminate films of Examples 1-3 versus that of ethylene-propylene-butene (EPB) copolymers used as sealants in the laminate films of Examples 4 and 5. The lower storage shear modulus of the laminate films of Examples 1-3 indicates that these sealants could provide more hermetic sealing than the EPB copolymers of the laminate films of Examples 4 and 5 as a lower storage shear modulus indicates that the resin would flow more easily when placed under heat and pressure. Sealing in packaging machines is generally carried out under conditions of low shear (low frequency).
Figure 2:
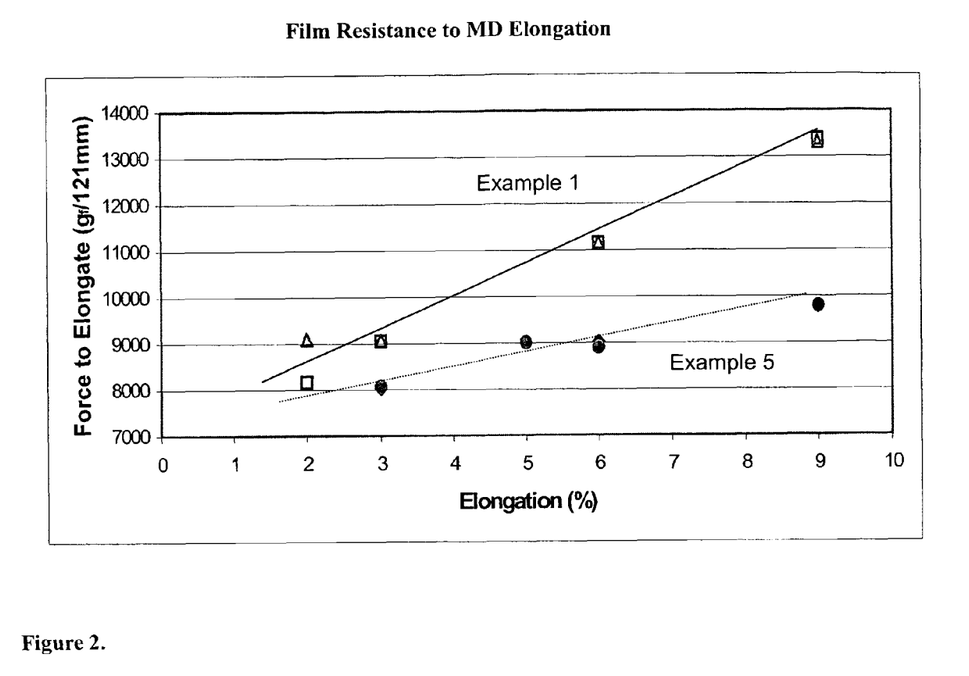
FIG. 2 shows that the laminate film of Example 1 (and similarly of the laminate films of Examples 2, 3 and Example 4) having a higher machine direction (MD) tensile properties requires more force to elongate in grams per 4.75 inches width ($g_f$/4.75 in or $g_f$/25 mm) the same amount as a lower MD tensile film such as Example 5.
Figure 3:
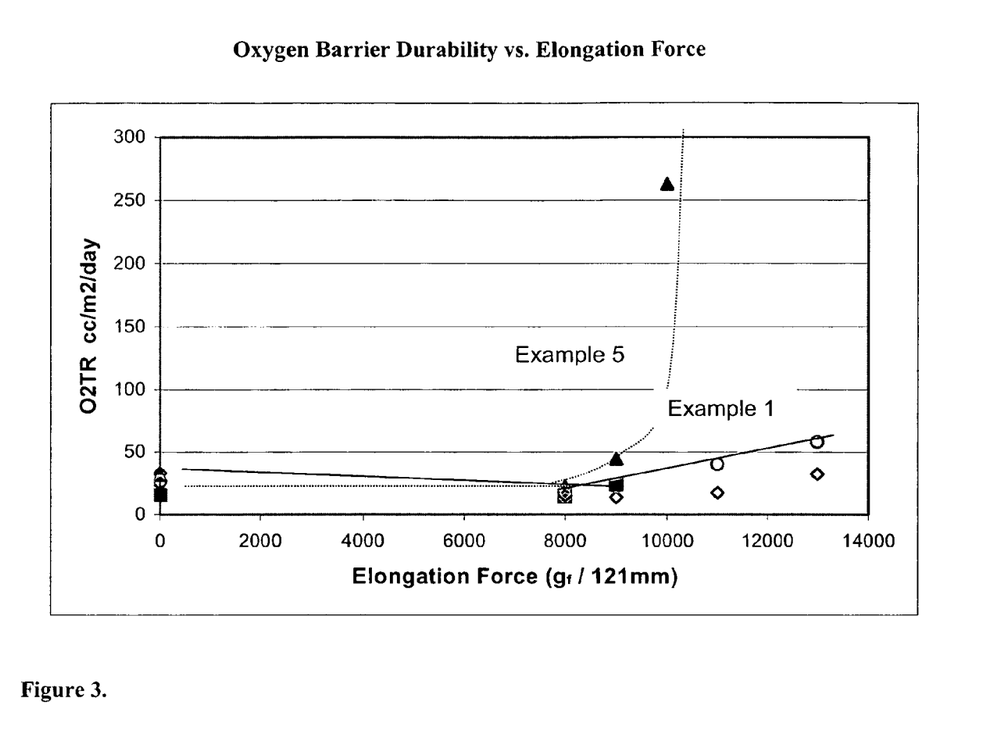
FIG. 3 demonstrates that because of the higher resistance to elongation of the laminate film of Example 1 (and similarly of the laminate films of Examples 2, 3 and Example 4), the barrier properties of the laminate film are maintained even when the laminate film is elongated. Thus, the laminate films with high MD tensile properties would have significantly better formed bag barrier durability.
Figure 4:
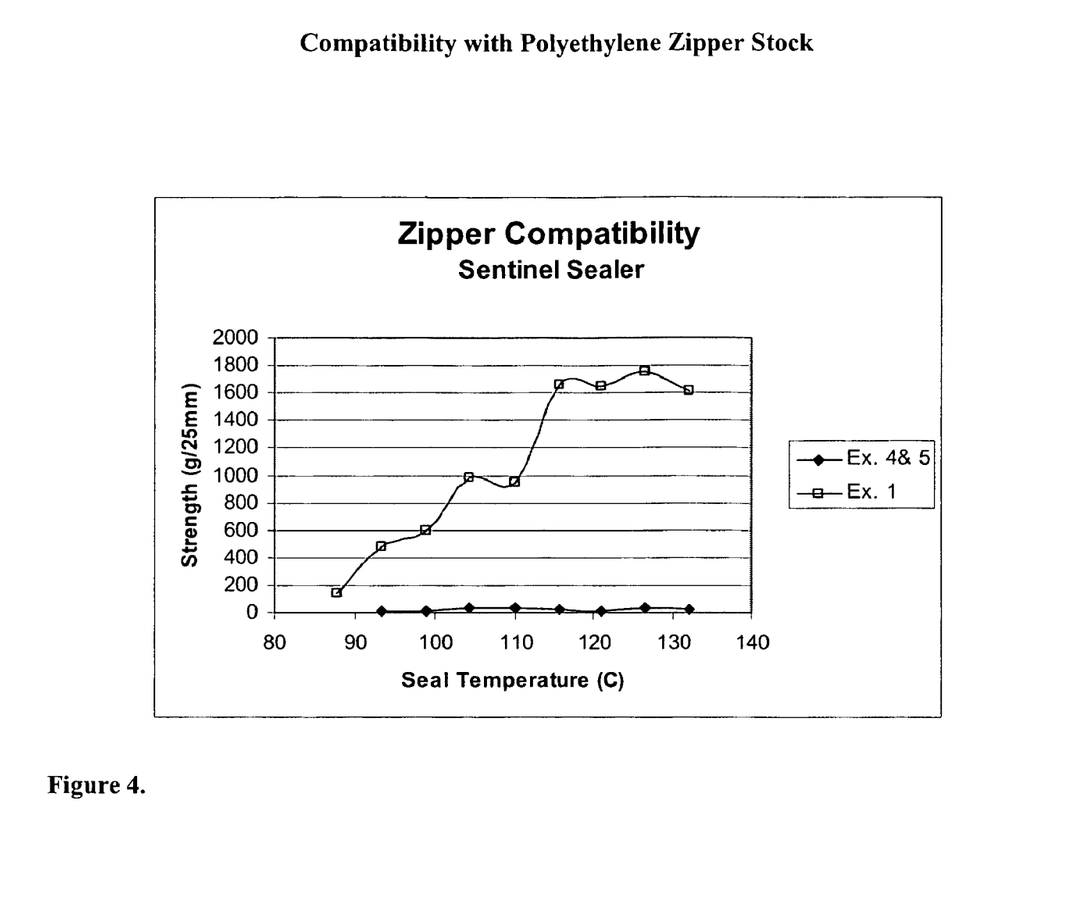
FIG. 4 demonstrates that the plastomers used in the laminate films of Examples 1-3 are more compatible to the polyethylene zipper stocks than ethylene-butylene-propylene (EBP) copolymer sealants used in the laminate films Example 4-5.
Figure 5:
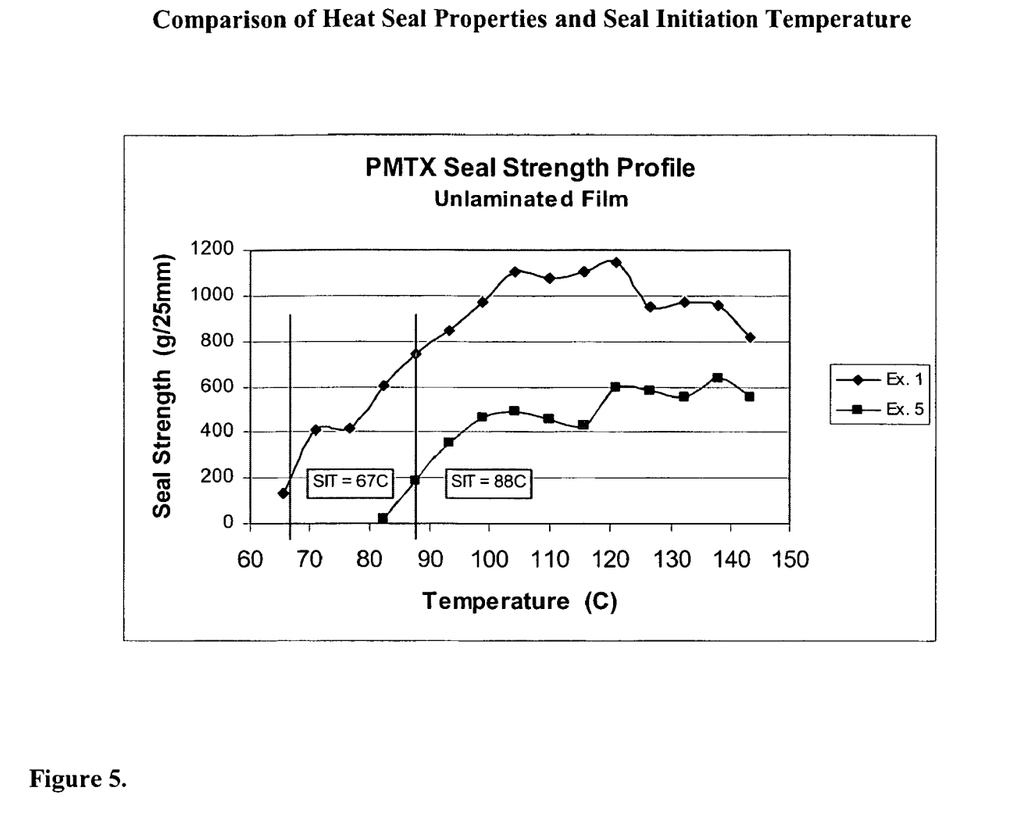
FIG. 5 shows that the plastomers used in the laminate films of Examples 1-3 demonstrate a significantly lower seal initiation temperature (SIT) than the EPB copolymers used in the laminate films of Example 4-5. Heat seal strengths also tend to be higher, but this could also be influenced by the thickness of the sealant layer.

The heat sealable layer comprises a polyolefin-containing plastomer such as an ethylene-octene copolymer, ethylene-containing octene plastomer, ethylene-containing hexene plastomer, ethylene-containing butene plastomer, or combinations thereof. These plastomers are characterized by density of 0.880-0.905, peak melting point of 73-89° C., and low storage shear modulus G' in the range of 1300 Pa or less at 0.1 rad/s, 5000 Pa or less at 1.0 rad/s, 100,000 Pa or less at 10 rad/s, and 400,000 Pa or less at 100 rad/s at 250° F. (121° C.). FIG. 1 illustrates and compares storage shear modulus of suitable plastomers of the invention compared to typical conventional ethylene-propylene-butylene copolymers. Suitable plastomers can be those obtained from EXXONMOBIL's EXACT™ plastomer series such as EXACT™ 8203 ethylene octene copolymer, EXACT™ 4150 and 3139 ethylene-containing hexene plastomers, and DOW's AFFINITY™ ethylene-containing plastomer series such as PL1850G.

The heat sealable layer contains anti-blocking agents and additives for good machinability in about 0.05-0.5% by weight of the heat-sealable layer. The antiblocking package also helps prevent metal pick-off caused by intimate contact of the heat sealable layer with the metallized side of the coextruded film when wound in roll form. Additionally, it is preferable that this sealant layer be formulated with an antiblock package to improve downstream processing and machining as well as to help minimize said metal pick-off when the film is in wound form. Suitable antiblock materials are those such as silicas, silicates, polymethylmethacrylate particles, and crosslinked silicone polymer particles. In particular, spherical crosslinked silicone polymer particles (polymethylsilsesquioxane) are preferred such as those marketed under the trade name TOSPEARL™. Antiblock particle sizes are in the range of 0.5-20 micron in diameter, preferably 2-15 micron in diameter, and most preferably 4-12 micron diameter. Particularly preferred is a blend of two differently sized antiblock particles so as to provide a bimodal particle distribution such as a blend of two dissimilar particle sizes of nominally 4.5 micron and 12 micron. Suitable particle size blend ratios range from 90% of the smaller particle size with 10% of the larger particle size to 10% of the smaller particle size with 90% of the larger particle size by weight of the sealant layer. In particular, a blend ratio of 75% 4.5 micron TOSPEARL™ with 25% 12 micron TOSPEARL™ is preferred for effective antiblocking properties, machining properties, coefficient of friction (COF) control, and minimizing pick-off of the metallized layer. Suitable loadings of the antiblock mixture are in the range of 1000-10,000 ppm by weight of the sealant layer, most preferably 4000-5000 ppm.

The metal adhesion layer could have a thickness after biaxial orientation in the range of 0.5-3 μm, preferably 1.0-2.0 μm.

The multi-layer laminate sheet is extruded through a multi-layer compositing die and cast onto a cooling drum whose surface temperature is controlled between 20° C. and 60° C. to solidify the non-oriented laminate sheet.

The non-oriented laminate sheet is stretched in the longitudinal (machine) direction at about 130 to 180° C. at a stretching ratio of preferably in the range of 5.5 to about 8 times the original length, and more preferably between about 6 and about 7 times the original length. The sheet is also stretched in the transverse direction at about 130 to 180° C. at a stretching ratio of about 7 to about 12 times the original length and then heat-set or annealed to minimize thermal shrinkage and maintain consistent dimensional stability of the film to give a biaxially oriented sheet. The superior machine direction tensile properties of the biaxially oriented polypropylene film (e.g. machine direction Young's modulus of 400,000 psi (2,757,903 kPa) or more, 110% or less elongation, and 30,000 psi (206,843 kPa) or higher tensile strength) is imparted by said high machine direction stretching ratios of 5.5 or greater. The biaxially oriented film has a total thickness between 6 and 40 μm, preferably between 10 and 25 μm, and most preferably between 15 and 20 μm. The stretching process itself may be done by either sequential orientation (machine direction stretching followed by transverse stretching), or by simultaneous orientation (machine and transverse direction stretching performed simultaneously). The simultaneous orientation process was unexpectedly found to outperform the sequential orientation process as explained below.

For practical purposes and high productivity of producing BOPP films with machine direction stretch ratios of minimum 5.5 and greater, those skilled in the art would appreciate that the simultaneous orientation process equipment as developed by Bruckner Maschinenbau GmbH's LISIM® technology, aids greatly in the production of such highly oriented BOPP coextruded films and in producing defect-free film due to the fact that there is no chance of sticking issues with the relatively low melting point of the invention's sealant layer formulation to heated machine direction rollers or ovens as a sequential orientation production machine could have, since the simultaneous orientation design does not require such heated machine direction rollers. Bruckner's LISIM® Linear Motor Simultaneous Stretching technology utilizes individual linear motor speed-controlled tenter oven clips that can move separately from each other in the machine direction at a programmable rate giving control over a variety of machine direction stretching ratios for machine direction orientation. Simultaneously, as these clips diverge on the tenter chain rail, transverse direction orientation is imparted with the machine direction orientation.

If sequential orientation process is used, it is preferred and recommended to modify the machine direction orientation section's heated rollers with a non-stick, high temperature resistant material such as TEFLON™ (polytetraflouroethylene) coatings, tapes, or coverings to prevent sticking of the invention's sealant formulation and thus, minimize aesthetic defects or film breakage.

The non-sealant surface of the polyolefin resin layer of the biaxially oriented laminate film is subjected to a corona discharge or flame treatment. The treated laminate sheet is then wound into a roll. The roll is placed in a metallizing chamber and the metal is vapor-deposited on the treated polyolefin resin layer surface. The metal film may include titanium, vanadium, chromium, manganese, iron, cobalt, nickel, copper, zinc, aluminum, gold, or palladium, the preferred being aluminum. The metallized film is then tested for oxygen and moisture permeability, optical density, metal adhesion, and film tensile properties, and barrier durability.

This invention would be better understood with reference to the following examples, which are intended to illustrate specific embodiments within the overall scope of the invention.

Example 1

One hundred parts by weight of a crystalline propylene homopolymer resin, nominal 90% isotacticity or more, and melt flow rate of 2.5 g/10 min for the core layer; 100 parts by weight of a propylene homopolymer resin of nominal 86% isotacticity with a heat of fusion of 72 J/g and melt flow rate of nominal 3 g/10 min and 0.0003 parts by weight of a sodium calcium aluminosilicate powder having a mean particle diameter of 3 μm, were blended together for the metal adhesion resin layer; for the sealant layer, 100 parts by weight of an ethylene-octene plastomer EXACT™ 8203 was blended with 3750 ppm by weight of the sealant layer of a crosslinked silicone polymer of mean particle diameter of 4.5 μm and 1250 ppm by weight of the sealant layer of a crosslinked silicone polymer of mean particle diameter of 12 μm for a combined total of 5000 ppm by weight of the sealant layer. These polyolefin layers were coextruded and biaxially oriented to form a three-layer film with a total thickness of 20 μm. The resulting film had a metal adhesion layer of ca. 1 μm thickness after biaxial orientation, the sealant layer had a thickness of ca. 3 μm after biaxial orientation and the core layer was ca. 16 μm after biaxial orientation. The three-layer film was oriented in the machine direction at 6.0 times its original length and oriented in the transverse direction at 7.5 times its original width. The film was then flame-treated on the metal adhesion resin layer (the metallizing surface) and wound in roll form. The roll was then metallized by vapor-deposition of aluminum onto the flame-treated surface to an optical density target of 2.4. The metallized laminate film was then tested for oxygen and moisture permeability, tensile

Example 2

A process similar to Example 1 was repeated except that the metal adhesion layer comprised a blend of 75% by weight of the low isotactic propylene homopolymer and 25% by weight of an ethylene-propylene copolymer of nominal 1.0% ethylene content.

Example 3

A process similar to Example 1 was repeated except that an ethylene-hexene plastomer EXACT™ 4150 was substituted for the EXACT™ 8203 plastomer.

Example 4

A process similar to Example 1 was repeated except that the EXACT™ 8203 sealant layer was substituted by an ethylene-propylene-butene copolymer BASELL ADSYL™ 5C30F (a copolymer of about 3.2% ethylene content, 6% butene content, and the remaining content propylene) with 4000 ppm by weight of the sealant layer of crosslinked silicone polymer of nominal 2 µm size. The sealant layer was also 1.5 micron in thickness instead of 3 micron. The core layer thickness was increased by 1.5 micron to 17.5 micron to maintain overall film thickness at 20 micron after orientation.

Example 5

A process similar to Example 4 was repeated except that the film was oriented in the machine direction at 4.5 times its original length and oriented in the transverse direction at 8 times its original width and the sealant layer comprised an ethylene-propylene-butene copolymer SUMITOMO SPX79F1 a copolymer of about 1.4% ethylene content, 15.6% butene content, and the remaining content propylene.

The various properties in the above examples were measured by the following methods.

Oxygen transmission rate of the film was measured by using a Mocon Oxtran 2/20 unit substantially in accordance with ASTM D3985. In general, the preferred value was an average value equal to or less than 15.5 cc/m$^2$/day with a maximum of 46.5 cc/m$^2$/day.

Moisture transmission rate of the film was measured by using a Mocon Permatran 3/31 unit measured substantially in accordance with ASTM F1249. In general, the preferred value was an average value equal to or less than 0.155 g/m$^2$/day with a maximum of 0.69 g/m$^2$/day.

Optical density was measured using a Tobias Associates model TBX transmission densitometer. Optical density is defined as the amount of light reflected from the test specimen under specific conditions. Optical density is reported in terms of a logarithmic conversion. For example, a density of 0.00 indicates that 100% of the light falling on the sample is being reflected. A density of 1.00 indicates that 10% of the light is being reflected; 2.00 is equivalent to 1%, etc.

Metal adhesion was measured by heat sealing on a SENTINAL Sealer model 12 ASL at 220° F. (104.4° C.) seal temperature, 15 second dwell, and 15 psi (103.42 kPa) seal jaw pressure, a piece of 1-mil (25 µm) thick Ethylene Acrylic Acid polymer film (EAA) to the metallized surface of a single sheet of metallized film and measuring the 180° peel strength of the metal from the substrate substantially in accordance with AIMCAL (Association of Industrial Metallizers, Coaters, and Laminators) test procedure TP-105-92. The test procedure and a kit of materials can be obtained from AIMCAL's website www.aimcal.com. The Metal Adhesion Test Kit is designed to permit testing using TP-105-92. The test kit contains 2 rolls of 3M™ tape #610, 2 rolls of EAA film and an AIMCAL Metallizing Technical Reference Manual. The test kit contains enough material to do at least 100 tests as described in the Technical Reference Manual, (TP-105-92). The test procedure used in testing the samples used in the examples of this application is described in AIMCAL Metallizing Technical Reference (Third Edition, © 2001). In general, preferred values of metal adhesion ranged from about 200 g/in (200 g/25 mm) or higher.

Barrier durability of the film was measured by elongating test specimens with original dimensions of 10" (254 mm) long (MD) by 4.75" (121 mm) wide (TD) in an Instron Tensile tester at various elongation percentages up to 9% elongation. The force to elongate the test specimens at each elongation percentage was recorded using the Instron Tensile tester's load cell. The elongated samples were then measured for barrier properties using Mocon Oxtran 2/20 or Permatran 3/31 units. In general, preferred values of O$_2$TR (oxygen transmission rate), which is a measurement of the permeation rate of oxygen through a substrate, would be equal or less than 46.5 cc/m$^2$/day up to 9% elongation and MVTR (moisture vapor transmission rate), which is a measurement of the permeation rate of water vapor through a substrate, would be equal or less than 0.69 g/m$^2$/day up to 9% elongation.

Tensile properties were measured in an Instron Tensile tester. The biaxially oriented films were tested in both the machine direction and transverse directions. Young's Modulus, Elongation (% strain at ultimate), and Tensile Strength (stress at ultimate) was tested substantially in accordance with ASTM D822.

Storage Shear Modulus G' was measured on the polymer resins of interest using parallel plate rheometry at 121° C. substantially in accordance with ASTM D4440 and D4065.

Heat seal testing was conducted on unlaminated sheets of the metallized film examples using a SENTINEL SEALER model 12 ASL, at 0.5 second dwell, 20 psi (137.9 kPa) seal jaw pressure, with upper sealer jaw flat bar design, heated, and TEFLON™ coated, and lower sealer jaw flat bar design, unheated, and rubber with glass cloth covering. Heat seal strength curves were generated by sealing the heat sealable side of the film sample to itself at various temperatures in 10° F. (5.56° C.) increments from 150° F. (65.56° C.) to 290° F. and measuring the peel force to separate the seal bonds on an INSTRON tensile tester. Seal Initiation Temperature (SIT) was defined as the seal temperature at which the film demonstrated 200 g/inch (200 g/25 mm) seal strength. Compatibility of Polyethylene zipper stock (such as obtainable from LPS Industries Top-Loc® polyethylene zippers) was evaluated by heat sealing the zipper stock to the sealant side of the film sample in the SENTINEL Sealer at the same conditions and methods as heat seal strength curve testing.

Coefficient of Friction (COF) testing was conducted in accordance with ASTM D1894 using a Testing Machine, Inc. (TMI) model 32-06 Monitor/Slip & Friction tester. Preferred values for static and dynamic COF were less than 1.000.

The results of the foregoing examples ("are shown in Tables 1 and FIGS. 1, 2, 3, 4, and 5.

TABLE 1

|  | Example 1 | Example 2 | Example 3 | Example 4 | Example 5 |
|---|---|---|---|---|---|
| MD Modulus (psi) | 400,227 | 414,696 | 390,625 | 428,451 | 322,692 |
| (kPa) | (2,759,468) | (2,859,228) | (2,693,264) | (2,954,066) | (2,224,883) |
| MD Elongation (%) | 107 | 106 | 119 | 96 | 185 |
| MD Tensile Strength (psi) | 30,181 | 34,241 | 28,720 | 38,231 | 24,191 |
| (kPa) | (208,091) | (236,083) | (198,017) | (263,593) | (166,791) |
| Metal Adhesion g/in or g/25 mm)) | 192 | 212 | 188 | 184 | 250 |
| Optical Density | 2.3 | 2.4 | 2.2 | 2.3 | 2.2 |
| O2TR (cc/m2/day) |  |  |  |  |  |
| 0% elongation | 8.5 | 15.4 | 13.0 | 12.1 | 18.4 |
| 9% elongation | 21.2 | 25.6 | 18.5 | 26.9 | 240 |
| MVTR (g/m2/day) |  |  |  |  |  |
| 0% elongation | 0.16 | 0.19 | 0.18 | 0.12 | 0.18 |
| 9% elongation | 0.22 | 0.34 | 0.27 | 0.24 | 0.95 |
| COF static | 0.904 | 0.901 | 0.808 | 0.423 | 0.666 |
| dynamic | 0.550 | 0.605 | 0.483 | 0.276 | 0.306 |

Table 1 shows machine direction (MD) tensile properties, barrier, metal adhesion, and COF properties of the example films. The high MD tensile property examples (Examples 1-3, Example 4) all show superior 9% elongated barrier properties vs. Example 5 which was made with lower MD tensile properties. COF is better with Example 4 and 2 due to using thinner sealant resin layers with higher melting points than the plastomer types used in Examples 1-3.

The above description is presented to enable a person skilled in the art to make and use the invention, and is provided in the context of a particular application and its requirements. Various modifications to the preferred embodiments would be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein. This application discloses several numerical range limitations. This application supports any range within the disclosed numerical ranges even though a precise range limitation may not be stated verbatim in the specification because this invention can be practiced throughout the disclosed numerical ranges. Finally, the entire disclosure of the patents and publications referred in this application are hereby incorporated herein by reference.

The invention claimed is:

1. A method of manufacturing a surface-treated laminate film comprising (a) a surface treated polyolefin-containing resin layer having a flame or corona treated surface and (b) a heat sealable resin layer that is not directly on the flame or corona treated surface, the heat sealable resin layer having a storage shear modulus of 400,000 Pa or less at 100 rad/s at 121° C., 100,000 Pa or less at 10 rad/s at 121° C., and 5000 Pa or less at 1 rad/s at 121° C., and a melting temperature of 73° C.-89° C., the method comprising:
coextruding a laminate film comprising at least a polyolefin-containing resin layer and a heat sealable resin layer and simultaneously stretching the coextruded laminate film in machine and transverse directions of the laminate film; and then
surface treating the laminate film to produce a surface-treated laminate film,
whereby the surface-treated laminate film has tensile properties in a machine direction of the laminate film including a Young's modulus of 350,000 psi (2,413,165 kPa) or more, an elongation of 120% or less, and a tensile strength of 27,000 psi (186,158 kPa) or more.

2. The method of claim 1, wherein the heat-sealable layer of the surface-treated laminate film has a thickness of about 0.5 to 5.0 μm.

3. The method of claim 1, wherein the heat sealable layer of the surface-treated laminate film comprises an anti-blocking agent of about 0.05 to 0.5 percent by weight of said heat sealable layer.

4. The method of claim 1, wherein the surface treated polyolefin-containing resin layer of the surface-treated laminate film comprises additives that enhance metal adhesion or metal formation, and the metal layer of the surface-treated laminate film has a thickness of about 5 to 100 nm and an optical density of about 1.8 to 5.0.

5. The method of claim 1, wherein the stretching comprises biaxially orienting the laminate film at a 5.5-8.0 stretch ratio in the machine direction and a 7.0-12.0 stretch ratio in a direction transverse to the machine direction.

6. The method of claim 1, wherein the coextruding comprises co-extruding a heat sealable layer with a polyolefin-containing resin layer comprising an antiblock component selected from the group consisting of amorphous silicas, aluminosilicates, sodium calcium aluminum silicate, crosslinked silicone polymers and polymethylmethacrylate.

7. The method of claim 1, wherein the coextruding comprises co-extruding a heat sealable layer with a polyolefin-containing resin layer comprising a propylene homopolymer resin of isotactic content of 60-88% mesopentad fraction, an isotacticity of less than 90%, and a heat of crystal fusion of 20-90 J/g.

8. The method of claim 1, the coextruding comprises co-extruding a heat sealable layer with a polyolefin-containing resin layer comprising a blend of propylene homopolymer and a propylene-containing copolymer with ethylene in amounts of 0.5 to 10% ethylene, and the blend comprises 50 to 5% of said propylene-containing copolymer with ethylene and 5 to 50% of said propylene homopolymer.

9. The method of claim 1, wherein the surface treating results in a surface-treated laminate film having an oxygen transmission rate of 60 cc/m$^2$/day or less through the laminate film when the laminate film is elongated at 11,000 grams per 4.75 inches of film width elongation force.

10. The method of claim 1, wherein the coextruding produces a heat sealable resin layer directly on a surface of the surface treated polyolefin-containing resin layer opposite the flame or corona treated surface.

11. The method of claim 1, wherein the heat sealable resin layer consists essentially of polyolefin-containing plastomer and an antiblock component.

12. The method of claim 1, wherein the surface-treated laminate film further comprises an additional polyolefin-containing resin layer between the surface-treated polyolefin-containing resin layer and the heat sealable resin layer, wherein an order of layers in the laminate film is the heat sealable resin layer, the additional polyolefin-containing resin layer, and the surface treated polyolefin-containing resin layer.

13. The method of claim 12, further comprising depositing or forming a metal layer directly on the surface-treated polyolefin-containing resin layer, whereby an order of layers in the surface-treated laminate film is the heat sealable resin layer, the additional polyolefin-containing resin layer, the surface treated polyolefin-containing resin layer and the metal layer.

* * * * *